June 6, 1933. J. L. GRAY 1,912,634
AIR COOLED ROTARY INTERNAL COMBUSTION MOTOR
Filed May 3, 1930 8 Sheets-Sheet 5

Inventor
Jesse L. Gray

By
Jack A. Schley
Attorney

June 6, 1933.  J. L. GRAY  1,912,634
AIR COOLED ROTARY INTERNAL COMBUSTION MOTOR
Filed May 3, 1930  8 Sheets-Sheet 6

Inventor
Jesse L. Gray

By Jack A. Schley
Attorney

Patented June 6, 1933

1,912,634

UNITED STATES PATENT OFFICE

JESSE L. GRAY, OF DALLAS, TEXAS

AIR-COOLED ROTARY INTERNAL COMBUSTION MOTOR

Application filed May 3, 1930. Serial No. 449,414.

This invention relates to new and useful improvements in air-cooled rotary internal combustion motors.

One object of the invention is to provide an improved internal combustion motor of the gear or double rotor type having improved means for increasing the thermal and mechanical efficiencies, as well as its durability and dependability.

A further object of the invention is to provide an improved motor of the character described involving a new and novel tooth arrangement, whereby the most efficient operation is had, together with certain improvements in the air and fuel inlets.

Another object of the invention is to reduce the heat radiating surface in and around the combustion chambers, as well as to reduce the weight of the motor.

A still further object of the invention is to eliminate in a motor a greater number of wearing parts, such as gears, connecting rods, pistons, valves, resilient packings and the bearing surfaces of these parts.

A further object of the invention is to provide an improved rotary induction for the fuel intake whereby the fuel consumed is in proportion to the R. P. M. of the motor, thus making for proportional horsepower.

Another object of the invention is to provide a high speed motor through the elimination of all reciprocating parts and means whereby the ratio of horsepower to weight is increased with the increased R. P. M. of the motor.

A still further object of the invention is to provide an improved motor of the character described made on the two stroke cycle principle whereby the horsepower is increased.

Still another object of the invention is to provide an automatic ignition system and centrifugal air filtering means in combination with an improved forced air cooling system, as well as certain other advantages to be hereinafter pointed out.

A construction designed to carry out the invention will be hereinafter described together with other features of the invention.

The invention will be more readily understood from a reading of the following specification and by reference to the accompanying drawings in which an example of the invention is shown, and wherein.

In the drawings the numeral 20 designates a split gear case which is preferably given a frusto-conical shape so as to offer less wind resistance.

The gear case has a pinion housing 21 depending from its lower rear portion. The gear case and pinion housing are preferably made integral with a mounting plate 22 which is suitably supported as by tubing struts 23.

A bearing 24 is confined in an annular housing 25 mounted in the front end of the gear case 20 and a bearing 26 is confined in an annular housing 27 mounted in the rear end of the casing 20. A hollow shaft 28 is mounted in the bearings 24 and 26 and is provided with a bearing sleeve 29 which has its rear end screw threaded on the shaft and its front end forming a part of the bearing 24. The shaft extends forwardly from the gear case for receiving a propeller or other element which it is desired to drive and which is not shown. A gear 30 is securely mounted on the shaft and positioned centrally of the pinion housing for meshing with a pinion 31 rotatably mounted upon a tubular mandrel 32. The pinion is provided with bearings 33 and 34 confined by bearing housings 33' and 34' of the pinion and annular nuts 35' and 36' screw threaded into the housings 33' and 34'.

The mandrel 32 is provided with an annular flange 35 by which it is secured to the mounting plate 22 by bolts 36. The mandrel serves as an axis for the revolving parts of the motor and has one end 37 curved from the body of the mandrel. An elbow 38 is secured to the plate 22 and connects the mandrel with a carburetor 39. A fuel supply line 40 leads to the carburetor from a suitable supply source not shown. The carburetor has a throttle valve 41.

The pinion 31 is provided with an annular flange 42 having radial lugs 42' engaged in notches 43' in an annular collar 43 of a thrust bearing housing 44. The pinion is confined on the mandrel between the housing 44 and a shoulder 45 of the mandrel. The housing 44 confines a thrust bearing 46 which is secured therein by an annular nut 47. The bearing 46 bears against a shoulder 48 of the mandrel against which it is confined by a thrust sleeve 49 secured intermediate the housing 44 and a piston member or a male combustion ring 50. The sleeve 49 is secured to the back of the ring 50 within an annular manifold 53' and divides this manifold into an inner chamber B and an outer chamber C. This sleeve is of frusto-conical shape and is provided about its circumference with a plurality of blades 51 turned so as to force air within the sleeve as the motor revolves (best shown in Fig. 23).

An annular flange 52 is mounted within the sleeve for deflecting to outlet ports 53 foreign particles such as sand and dirt that may be in the air whereby these foreign particles will be expelled through the openings by centrifugal force.

Figure 3:
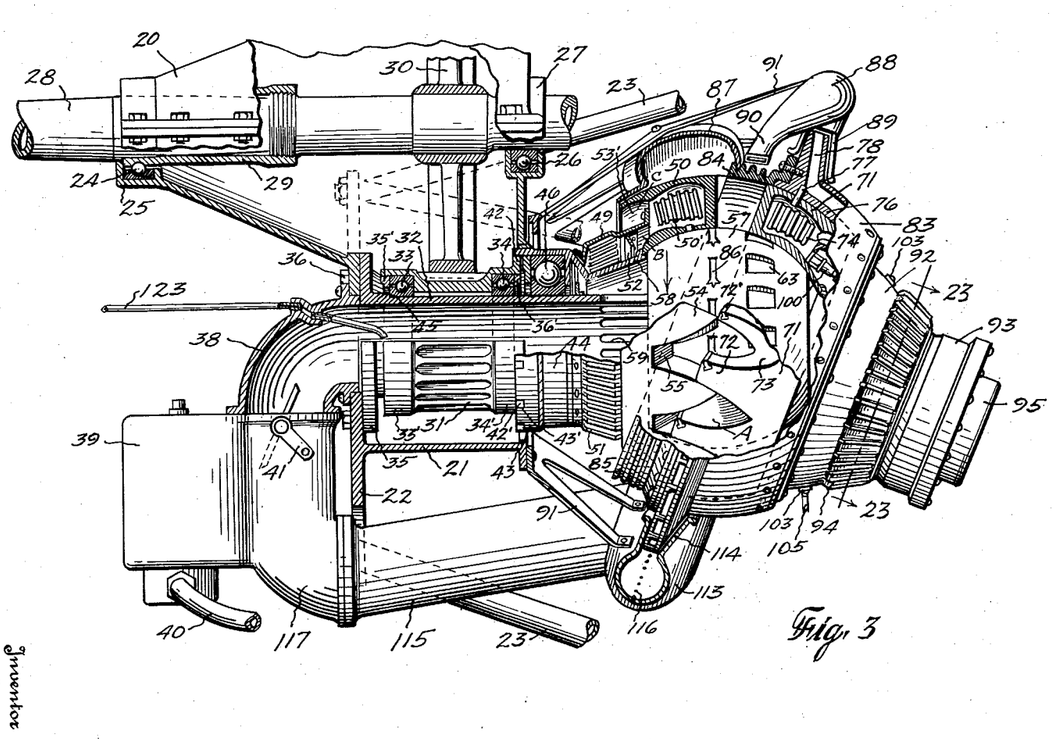
Figure 3 is a view partly in elevation and partly in section.
Figure 5:
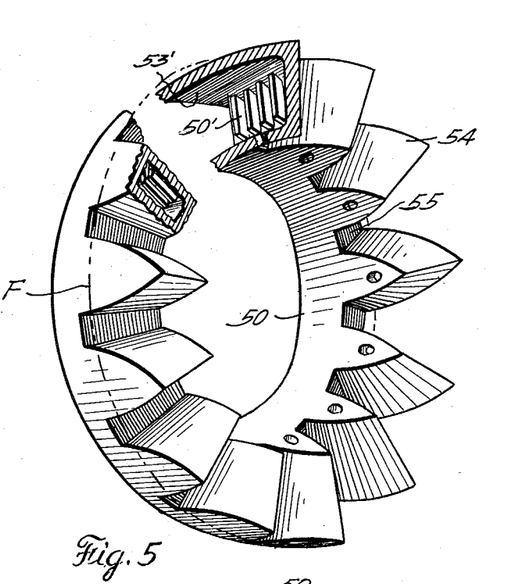

The male combustion ring 50 is provided with a plurality of pointed or apexed teeth 54 having seats 55 therebetween each tooth constituting a piston. As is shown in Figures 3 and 5, the teeth 54 are hollow cooling chambers and are provided on opposite sides with a plurality of internal heat radiating fins 50'.

In Figures 7, 8, 9 and 10 I show two arrangements of baffles 54' and 55' either of which may be used in connection with the fins 50' for increasing the velocity of air between said fins. If desired, the baffles and fins may be left entirely out of the hollow portions of the teeth. The hollow portions of these teeth connect with the annular manifold 53'. The ring is secured by pins 56 to a globular revolving head 57 in a vertical position.

A connecting sleeve 58 is secured between the head 57 and the bearing housing 44. This sleeve, together with the thrust sleeve 49 forms a channel for the passage of air from the blades 51 to the manifold chamber B from which the air is discharged into the hollow portions of the teeth 54. The air is discharged from the chamber C mainly by the centrifugal force imparted to the air when passing through the cooling chambers in the hollow teeth 54, which act thereon as centrifugal fan blades; such force being slightly augmented by the blades 51. In this manner a circulation of air is located within the hollow portions of the teeth.

The sleeve 58 encircles discharge ports 59 of the mandrel and serves to conduct the fuel gases to an annular manifold chamber 60 encircling the mandrel and within the head 57. Manifold ports 61 spaced radially of a web 62 in the head 57 connect the manifold chamber 60 with inlet ports 63 whereby fuel may pass from the manifold chamber to the inlet ports. The number of ports 63 corresponds to the number of seats 55 of the ring 50 opposite which the ports are positioned.

The web is provided with an annular groove 64 having shoulders 65, one of which is screw threaded for receiving an annular nut 66. A sleeve 67 telescopes into the opposite shoulder 65 and forms a circular channel between the shoulder and an internal annular flange 67″ of the head for connecting the ports 63. Bearings 68 are confined between the sleeve 67 and the nut 66. An annular corrugated spring 69 is confined in the groove 64 by the bearing 68. This spring serves as a cushion for the head 57 whereby as the head revolves it will find its true vertical axis due to centrifugal force.

Figure 4:
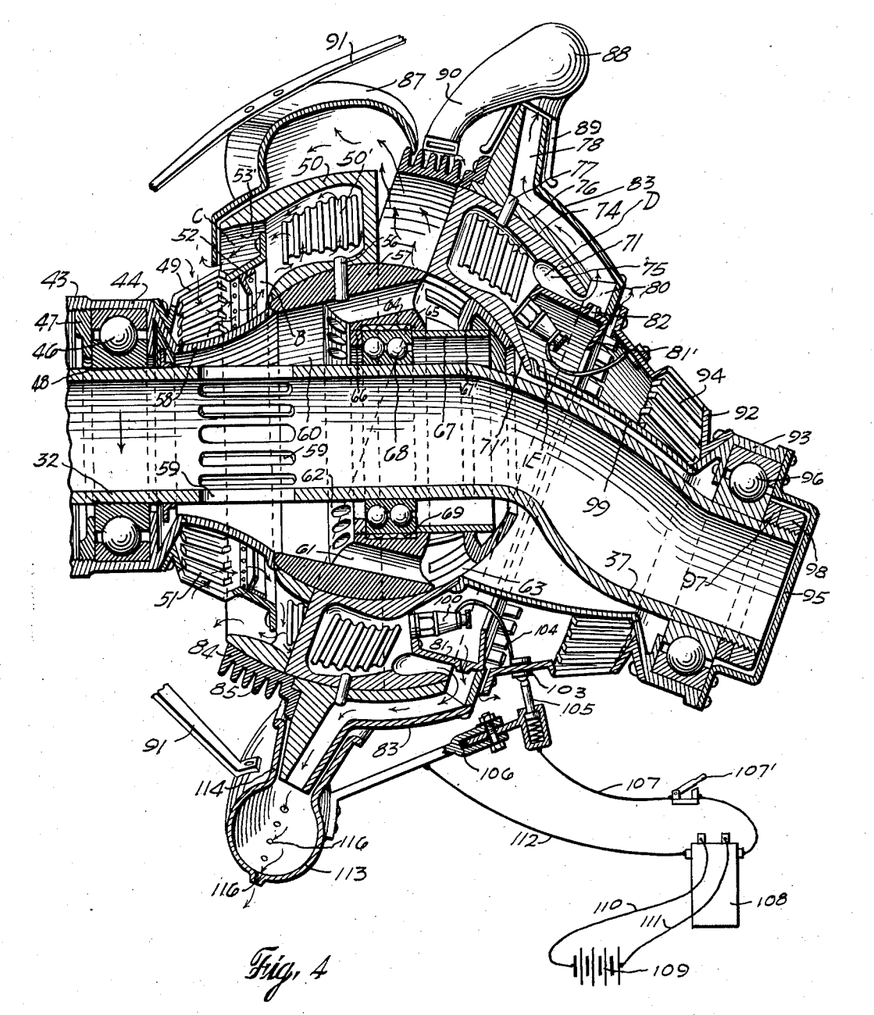
Figure 4 is an enlarged vertical sectional view taken on line 4—4 of Figure 2, Figures 5 and 6 are perspective views of the internal combustion rings showing a portion of the teeth in section.
Figure 18:
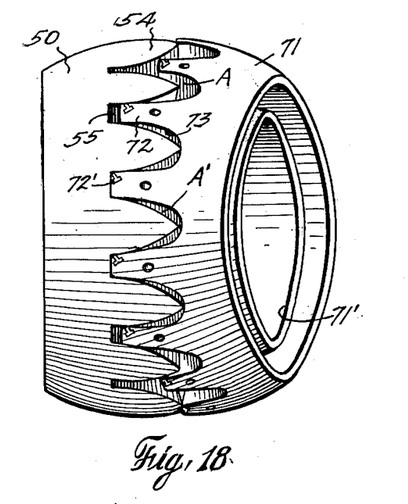
Figure 18 is a bottom view of the same.

A chamber member or a female combustion ring 71 is mounted on the head 57 with its axis at an acute angle to the axis of the ring 50 and with its teeth 72 intermeshing with the teeth 54 of the combustion ring 50 at the lower side of the motor (Figs. 3, 4 and 18). The ring 71 has chambers or valleys 73 provided between its teeth 72 and in which the teeth 54 of the ring 50 engage. The teeth of this combustion ring are hollow to form cooling recesses as are those of the ring 50 and are provided with cooling fins 74. Each tooth 72 is provided in one corner with a replaceable T shaped wear key 72′ (best shown in Figures 12 and 22.) The ring 71 is also provided with an annular manifold 75 connecting with the hollow portions of the teeth 72.

Figure 6:
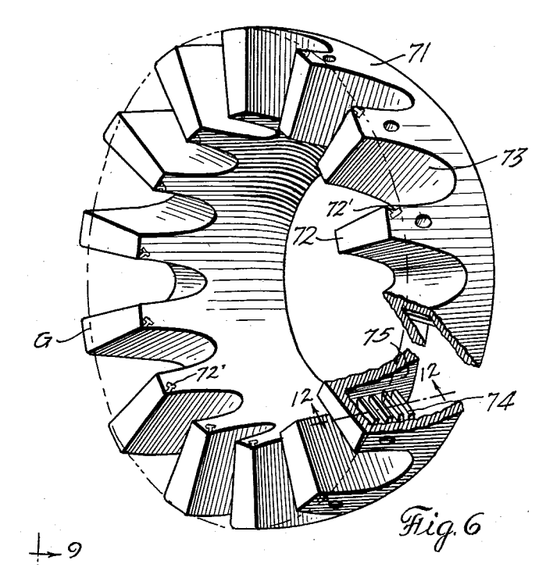
Figure 7:
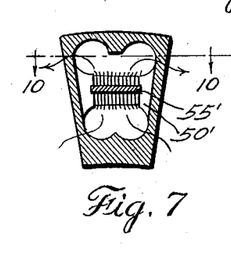
Figures 7 and 8 are enlarged transverse sectional views of the combustion ring teeth showing alternate forms of air channels therein.
Figure 8:
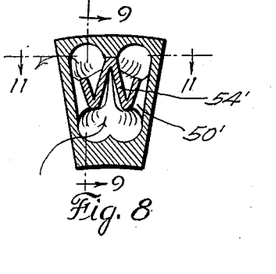
Figure 9:
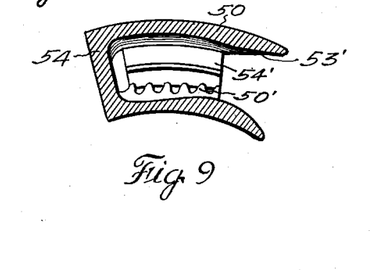
Figure 9 is a sectional view taken on line 9—9 of Figure 8.
Figure 13:
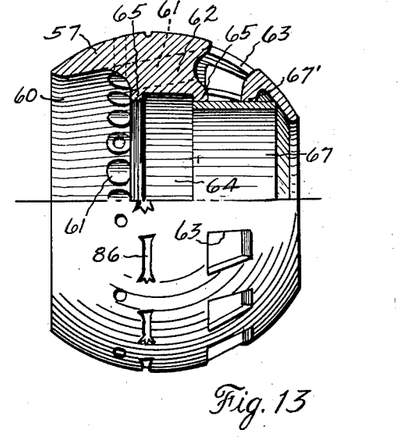
Figure 13 is a view partly in section and partly in elevation of the globular revolving head.
Figure 14:
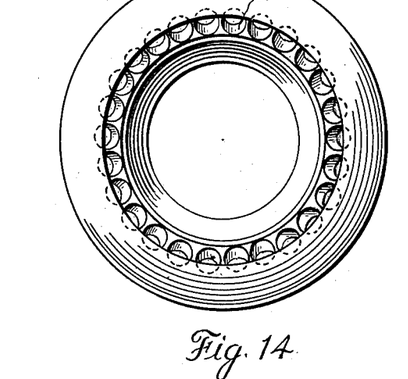
Figure 14 is an end elevation of the same.
Figure 15:
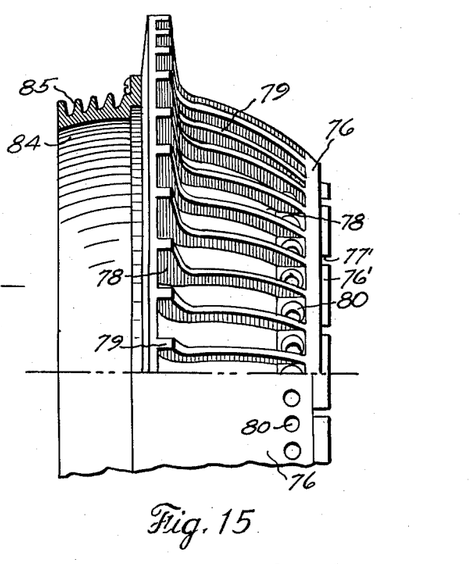
Figure 15 is a view partly in section and partly in elevation of a combustion chamber casing.

It will be observed that the teeth 54 of the ring 50 (Fig. 5) have a long tooth addendum above the pitch circle F and a very short tooth base below said pitch circle; while the teeth 72 of the ring 71 have conversely a very short tooth addendum above the pitch circle G (Fig. 6) and a long tooth base or root below said pitch circle. The long tooth addendum of the teeth 54 gives the teeth of both rings a long sliding contact from the pitch circle F to the tooth apex. This length of sliding contact is the length of effective piston travel. In the structure illustrated, the ring 71 has one tooth 72 more than the ring 50 has teeth 54 whereby the ring 50 has a slightly higher rotative speed than the ring 71 and the teeth 54 engage in the succeeding valleys 73 at each revolution of the rings.

Figure 1:
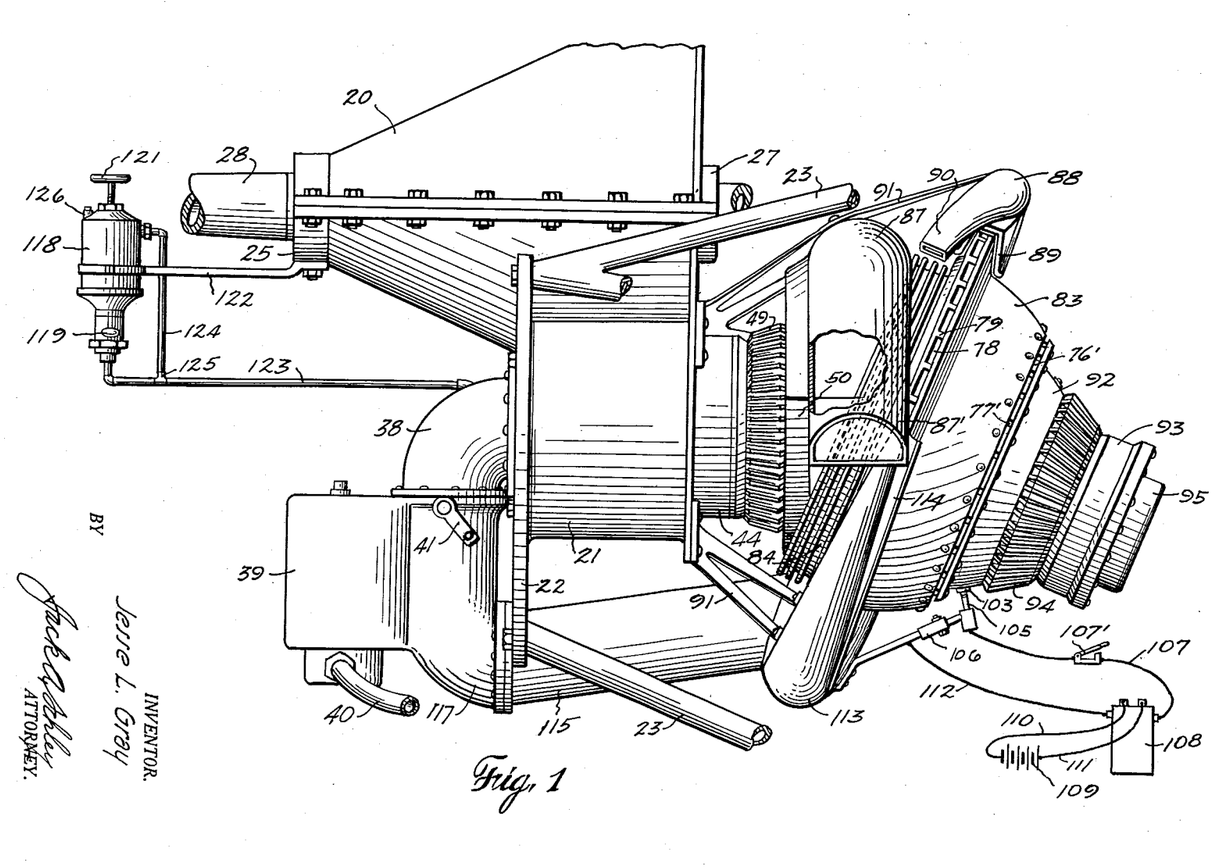
Figure 1 is a side elevation of a motor constructed in accordance with the invention.

A casing 76 secured to the combustion ring 71 by pins 77, encircles the ring and has one end overhanging the same. A plurality of radial suction flues 78 are provided in the casing between ribs 79 (Figure 1). These flues connect with ports 80 in the overhanging end of the casing. A sleeve 81 secured to the ring at the rear of the valleys 73 and extending to the rear of the casing 76, divides the manifold 75 into chambers D and E. The chamber D connects the ports 80 with the hollow portions of the teeth 72.

A plurality of openings 82 are provided radially in the sleeve 81 and opposite the ports 80 to provide a by-pass of the cool air within the chamber E to the ports 80 and flues 78. The openings 82 are large enough to permit a larger amount of the cool air to by-pass to the flues than passes through the hollow portions of the teeth, whereby the cool by-passed air will mix with and cool the hot air coming from the chamber D.

A cover 83 is provided on the casing whereby the air in the flue will be conducted outwardly to the outer ends of said flue. As the casing revolves the outer ends of the ribs 79 will act as fan blades for throwing the air from the flues, thereby increasing the induction within said flues. The casing 76 has a reduced annular collar 76′ extending rearwardly therefrom and provided with a plurality of radial slots 77′.

A sleeve 84 secured to the forward end of the casing 76 overhangs the teeth 72 and a portion of the ring 50. The sleeve 84 is provided with a plurality of radiating fins 85 positioned circumferentially of the sleeve to form air channels thereabout as the same revolves. The casing and sleeve, together with the revolving head 57 confine the combustion ring 71 and partially confine the combustion ring 50 thereby forming combustion chambers A within the valleys 73 and the seats 55 between each of the packing seals 72′. The sleeve forms a seal between the combustion rings.

A thrust sleeve 92, frusto-conical in shape, is secured at one end to the casing 76 and at its other end to a bearing housing 93. This sleeve is provided about its circumference with a plurality of blades 94 similar to the blades 51 for forcing air within the sleeve as the same revolves. The housing 93, together with a cap 95, confine a thrust bearing 96 which is positioned on the annular end of the mandrel 32 by a nut 97 and a lock nut 98.

A connecting sleeve 99 encircling the mandrel is secured between the bearing housing 93 and the inner flange 71′ of the combustion ring 71. The sleeve 92, together with a sleeve 99 forms an air channel from the blades 94 around the flange 81′ to chamber E from which the air is discharged into the hollow portions of the teeth 72. The air circulates between the fins 74 and passes into and through the chamber D to the ports 80 and the flues 78. The flange 81′ serves to deflect any foreign particles such as sand, dirt and the like which may enter through the blade openings, to the slots 77′ through which the foreign particles are expelled by centrifugal force.

Figure 16:
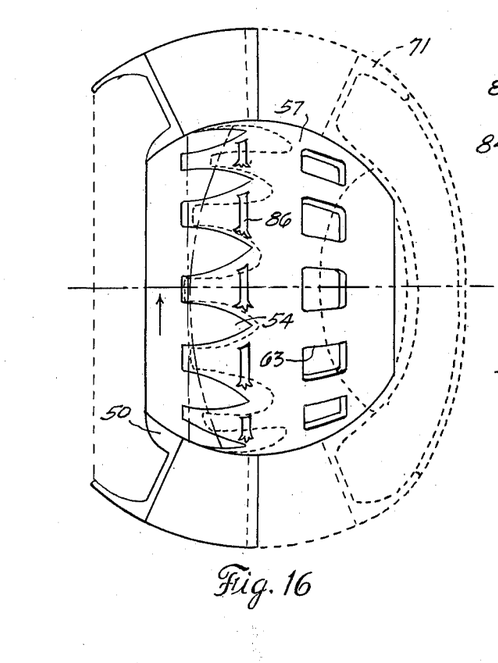
Figure 16 is a diagrammatical assembly of the revolving head and the combustion rings as seen from the bottom.

As is best shown in Figs. 3, 16 and 18, fuel will enter the combustion chambers A through the ports 63 and will be compressed in said chambers as the teeth of the rings mesh. When the chambers A are in a position A′ (Fig. 18) with the teeth 54 fully meshed with the teeth 72, the fuel charges in said chambers are fired. The explosion of the fuel will force the rings apart thereby causing them to revolve about their axes. The valleys 73 act as cylinders, while the teeth 54 act as pistons for compressing the fuel charges in said cylinders.

For automatically firing the fuel in the combustion chambers in successive order, I provide ignition ducts or grooves 86 spaced in the outer surface of the head and opposite each of the seats 55. These grooves serve to connect the adjacent combustion chambers at the point of firing whereby the explosion in one chamber will serve to ignite the compressed fuel in the succeeding chamber. One end of each groove is flared so as to spread the igniting flame within chamber to be fired.

Figure 17:
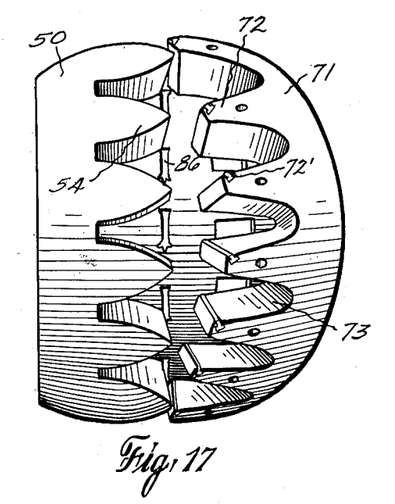
Figure 17 is a plan view of the combustion rings and revolving head assembly.

The angular mounting of the ring 71 in relation to the ports 63 is such that when the chambers A are enclosed by the casing 76 and sleeve 84, the fuel ports are also closed. As the combustion rings revolve, after the explosion of the fuel has taken place, the chambers A will begin to open, as shown in Fig. 17, thus allowing the exhausted gases to be discharged into an exhaust ring 87 having a discharge shank 87'. Also, the fuel ports 63 will be opened as the exhaust action takes place, thus permitting the fuel gases to enter into the combustion chambers and force out the exhausted gases. Due to high rotative speed of the motor the combustion chambers will be closed before any fuel gases have time to escape under normal operating conditions.

The exhaust ring is semi-circular in shape and is positioned over the upper portion of the motor to catch or receive the exhaust gases. As seen in Figures 3 and 4 the exhaust gases passing from the combustion chamber will heat up the outer edge of the sleeve 84, but it will be noted that only the inner portion of the sleeve is adjacent the combustion chamber during the compression of the fuel in said chamber and that trouble resulting from hot spots which cause pre-ignition will be done away with, thereby assuring the even firing order of the successive combustion chambers.

For cooling the sleeve 84, a horn shaped duct 88 positioned concentric to the motor has a flared opening 89 over the fan portion of the casing for receiving forced air from the flues 78 and for conducting this air through a nozzle 90 to the sleeve 84. The duct 88 and exhaust ring 87 are supported by braces 91 secured to the casing 20.

Figures 19, 20, 21, 23:
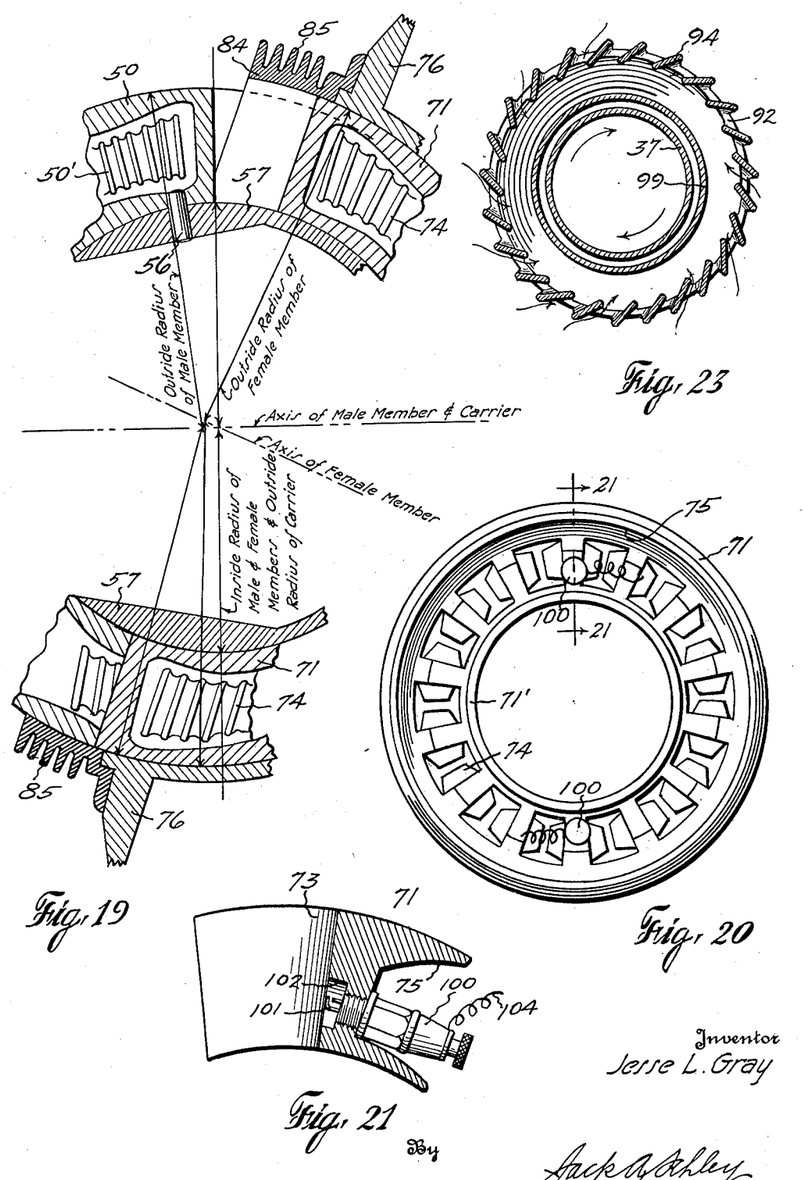
Figure 19 is a diagrammatical view showing the relation of the clearances of the combustion rings and the revolving head.
Figure 20 is a rear view of the female combustion ring.
Figure 21 is a sectional view taken on line 21—21 of Figure 20.
Figure 23 is a transverse sectional view taken on line 23—23 of Figure 3.

As is best shown in Figs. 4 and 21, spark plugs 100 are oppositely mounted within the manifold 75 in the rear of the valleys 73 with the spark gaps 101 of the plugs extending into circular grooves 102 in said valleys.

Contact points 103 are oppositely mounted in the thrust sleeve 92 opposite the spark plugs 100, to which they are connected by wire leads 104. A spring tensioned brush arm 105 is adjustably secured to and insulated from a supporting arm 106 at the bottom of the motor and is positioned to engage with the contacts 103 at A', the point of firing the fuel charge in the combustion chambers A. By the adjustable mounting of the brush arm 105, the firing position of the chambers A may be varied thus making for timing of the fuel explosion. The brush arm is connected with a suitable source of electric current such as a connection by a wire lead 107 to one side of a coil 108 which is charged by a battery 109 having electrical connections 110 and 111 to said coil. The opposite side of the coil is grounded to the support arm 106 by a wire connection 112. The support arm is mounted on a horn shaped duct 113 supported by the braces 91.

This duct is positioned concentric to the motor at its lower side and has a flared opening 114 over the fan portion of the casing 76 for receiving forced air from the flues 78 and for conducting this air to an induction tube 115 which is connected at one end to the duct 113.

A plurality of minute openings 116 are provided in the periphery of the duct for the discharging through said openings by centrifugal force, any foreign particles such as sand or dirt which may be in the air. The other end of the tube 115 connects with the intake 117 of the carburetor 39 for supplying air under pressure to said carburetor.

As the forced air coming from the flues 78 is warm, it will readily mix with the liquid fuel in the carburetor thereby forming a highly combustible gaseous fuel. This gaseous fuel is preheated as it passes through the manifold 60 and the ports 61 and 63, and is supplied to the chambers A in a readily combustible form.

Figures 2, 10, 11, 12, 26:
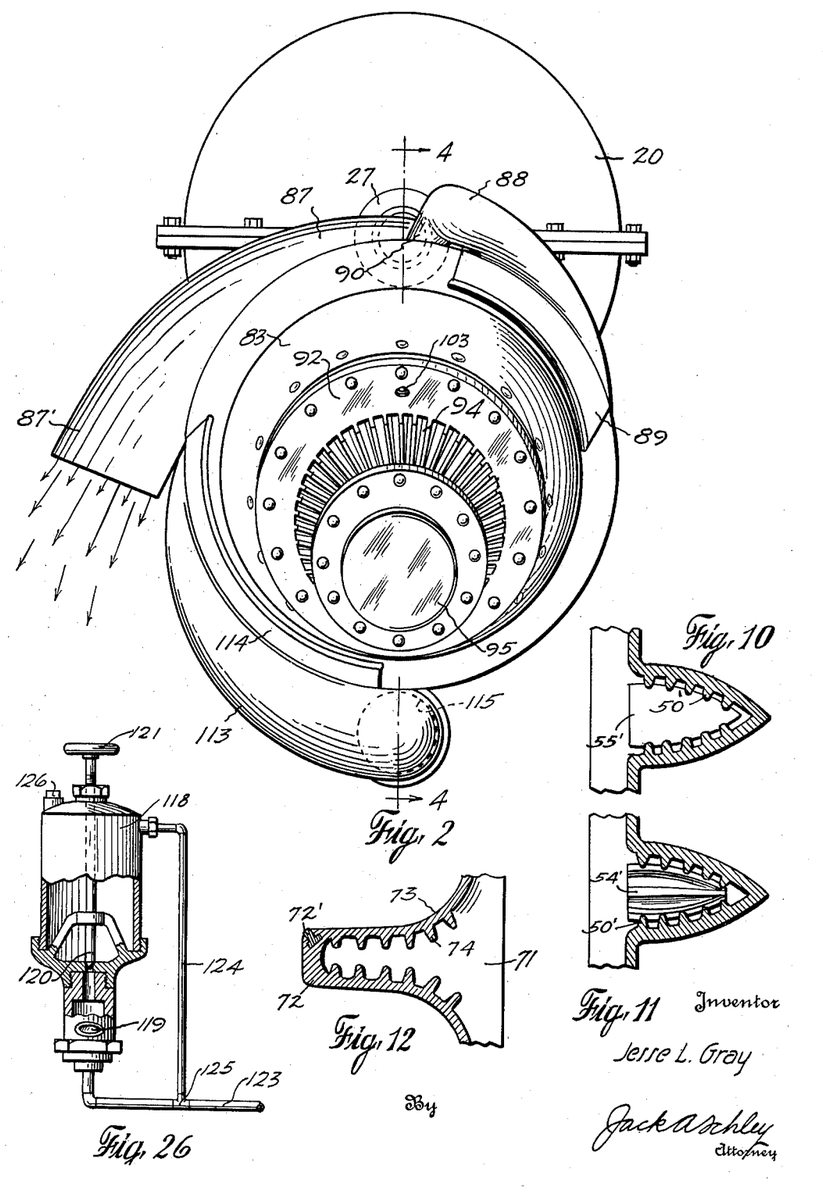
Figure 2 is an end elevation of the same.
Figure 10 is a cross-sectional view taken on line 10—10 of Figure 7.
Figure 11 is a cross-sectional view taken on line 11—11 of Figure 8.
Figure 12 is a cross-sectional view taken on line 12—12 of Figure 6.
Figure 26 is a view partly in section and partly in elevation of the lubricating means.

It is not believed necessary to go into detail of the lubricating system as practices well known in the art are used. However, I have shown a common method of lubricating the motor. As is best shown in Figures 1 and 26, I provide a lubricating container 118 having a sight feed 119 adjustable by a needle point valve 120 which is provided with a suitable knob 121 secured to the valve stem. The container is secured to the case 20 by a bracket 122 and has a lubricant conductor 123 leading from the sight feed 119 through the elbow 38 and discharging into the mandrel 32.

An air inlet conductor 124 has a T connection 125 at one end with the conductor 123 and is connected at its other end to the top of the container 118 whereby air may enter the discharge end of the conductor 123 and pass upward through the conductor 124 to within the top of the container 118 for displacing the lubricant in said container. The container has a removable plug 126 in its top to provide for the refilling of the container.

The needle valve 120 is adjusted to provide for a suitable drip of oil from the discharge end of the conductor 123 into the path of the fuel gases which pick up the oil and distribute it to the various parts of the motor.

In operating the engine, suitable fuel such as gasoline is supplied to the carburetor from a supply source not shown, through the conductor 40. The fuel is mixed with the warm air entering the intake 117 from the tube 115 and is distributed in gaseous form to the mandrel 32. The fuel passes from the mandrel through the discharge ports 59 to the manifold chamber 60 from which it in turn passes through the manifold ports 61 and the inlet ports 63 into the combustion chambers A.

A suitable starter (not shown) may be connected with the shaft 28 or said shaft may be manually revolved by turning the propeller (not shown) thereon for revolving the motor to prime the same. The spark plugs are used only for firing the compressed fuel in the chambers opposite said plugs as the succeeding chambers will be fired by the passage of the exploding fuel through the groove 86 from the preceding chambers. After the explosion in the first chamber has taken place, the brush arm 105 may be moved from contact position with the contacts 103 or the electrical connection to said brush arm may be broken as desired by provision of a stitch 107' in the wire lead 107.

It is to be understood that the invention is not to be limited to the use of spark plugs for starting purposes only, as spark plugs may be used in place of the ignition ducts for the successive firing of the fuel charges in the chambers A.

The engine is operated on a two cycle principle as will be explained by reference to a single compression chamber A. With reference to Figure 2, the engine revolves in an anti-clockwise direction. As the chamber A passes through the first quadrant of its revolution the chamber A is opened and the exhaust gases are expelled by the fuel gases as the inlet port 63 opposite said chamber opens simultaneously therewith. With the passage of the chamber through its second quadrant, the chamber and its inlet port close. The discharging of the exhaust gases from the chamber A and the intake of the fuel gases into said chamber therefore take place during the passage of the chamber A through its first and second quadrants, or through a semi-revolution.

As the chamber passes through its third quadrant, the fuel charge is compressed through the meshing action of the combustion rings. The fuel charge is fired or exploded at its highest point of compression, thereby causing the full force of the explosion to expand the chamber A. This expansion of the chamber takes place during its passage through the fourth quadrant and as the combustion rings disengage. The compression and expansion of the fuel therefore takes place during the passage of the chamber through the third and fourth quadrants or through a semi-revolution. In this manner the two cycle principle is carried out in a rotary internal combustion motor.

It is pointed out that the carburetor valve 41 provides a single control for regulating the speed of the motor. The improved rotary induction together with the small number of wearing parts makes for economy and efficiency in operation. The elimination of all reciprocating parts and the improved air cooling and air filtering systems provide for a high speed motor of increased desirability. Obviously the simplicity of construction reduces the weight of the motor which with the aforementioned features make for dependability.

Figures 22, 24, 25:
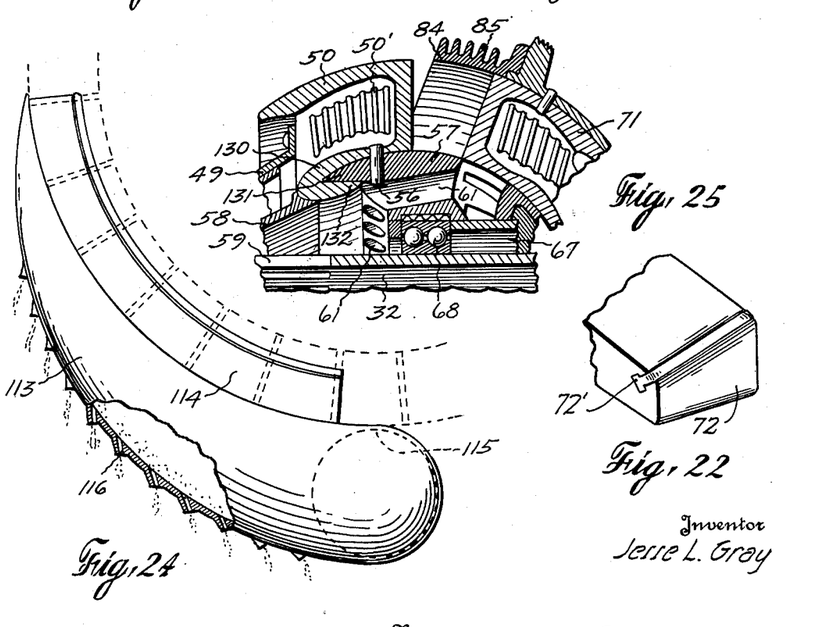
Figure 22 is a perspective view of one of the teeth of the female combustion ring.
Figure 24 is a view partly in section and partly in elevation of the horn shaped induction duct.
Fig. 25 is a sectional view showing an alternate form of mounting the apexed combustion ring to the revolving head.

I have shown in Figure 25 a modified form of mounting the male combustion ring 50 on the carrier head 57. This ring is provided with an internal annular hook 130 which is hooked over a reduced end 131 of the head 57, whereby the ring 54 is braced against radial displacement from said head. Also the bill 132 of the hook extends inwardly of the head beyond a transverse plane co-incident to the center of gravity of the ring 50 so that the center of gravity of said ring is transferred to the bill, whereby the centrifugal force of the ring is sustained by the head.

Various changes in the size and shape of the different parts, as well as modifications and alterations, may be made within the scope of the appended claims.

What I claim, is:

1. In a rotary engine, a revolving chamber member and a revolving piston member disposed at an angle to each other, whereby the elements of the piston member ride into and out of the chambers of the other member, a surrounding cooling sleeve carried by one of the members and into which the other member telescopes.

2. A rotary engine as set forth in claim 1 with the chamber member having one more chamber element than the piston member has piston elements, whereby the chamber elements are successively engaged thereby causing the piston member to revolve at a higher speed than the chamber member.

3. A rotary engine as set forth in claim 1 with the piston member being hollow and having internal means for dissipating heat.

4. In a rotary engine, a revolving chamber member and a revolving piston member disposed at an angle to each other, whereby the piston elements of one member ride into and out of the chamber elements of the other member, the piston members being hollow and having internal means for radiating heat, and means for circulating air through the hollow piston member to dissipate heat.

5. A rotary engine as set forth in claim 1 with the piston member being hollow and having heat radiating projections within the piston elements, cooling chambers connecting with the hollowed piston elements, means for introducing air to one of the cooling chambers, and means for exhausting air from the other cooling chambers.

6. As a subcombination in a rotary engine, a revoluble annular piston member having hollow radial teeth constituting piston elements; heat radiating projections within said teeth, and an internal manifold communicating with the hollow portions of said teeth.

7. A rotary engine as set forth in claim 1 with the chamber member having cooling recesses between its chambers, and means for circulating air through said chambers.

8. A rotary engine as set forth in claim 1 with the chamber member having cooling recesses between its chamber elements, means for introducing air to said recesses and means for exhausting air from said recesses.

9. In a rotary engine, rotating combustion members having intermeshing elements for compressing the fuel charge therebetween, means for circulating air through the intermeshing elements of said members, means for supplying fuel to said members, and means for conducting a portion of said circulated air to the fuel supply means, and means for discharging the remainder of such circulated air to atmosphere.

10. The combination set forth in claim 9 with a heat radiating sleeve carried by one of the combustion members, and means for directing air onto said sleeve for cooling the radiating sleeve.

11. As a subcombination in a rotary engine, a combustion ring having radial combustion chambers and cooling recesses between said chambers, spark plugs mounted in the chambers, and heat radiating elements within the cooling recesses.

12. As a subcombination in a rotary engine, a heat dissipating ring for surrounding the combustion members, means for conducting air from the combustion members, and discharging it upon the ring at the exhaust point of the combustion members.

13. In a rotary engine, a central support, a carrier surrounding the support and rotatable thereon, said carrier having fuel supply ports, a male combustion member carried by the carrier and rotatable therewith, a female combustion member rotatable on the carrier and having combustion chambers intermittently exposing the ports of the carrier, and means for supplying fuel to the carrier.

14. In a rotary engine, a tubular mandrel, a carrier surrounding the mandrel and rotatable thereon, said carrier having fuel supply ports, a male combustion member carried by the carrier and rotatable therewith, a female combustion member rotatable on the carrier and having combustion chambers intermittently exposing the ports of the carrier, and means for supplying fuel to the carrier.

15. A rotary engine as set forth in claim 1 with the chamber member having chambers and cooling recesses between its chambers, means for providing a circulation of air, means for filtering the air, means for introducing the air into the cooling recesses, and means for exhausting the air from said cooling recesses.

16. As a subcombination in a rotary engine, a combustion ring having cooling recesses, radial flues connecting with the recesses and discharging air therefrom, an intake manifold partially surrounding the flues and receiving the discharged air, means within the manifold for filtering the air, and a carburetor with which the manifold is connected for supplying air thereto.

17. In a rotary engine, a rotatable carrier, a male combustion member mounted on the carrier and rotatable therewith, and a female combustion member meshing with the male member and mounted to rotate on the carrier and co-acting with the male member, the carrier and the members having complementary arcuate faces in contact, whereby a fluid-tight connection is maintained therebetween.

18. In a rotary engine, a rotatable carrier having a partially spherical surface, a combustion member surrounding said carrier and immovably mounted on the surface thereof, and a second combustion member mounted to rotate around said carrier and to oscillate thereon and co-acting with the first member.

19. In a rotary engine, a rotatable carrier, a male combustion member mounted on the carrier and rotatable therewith, and a female combustion member rotatable on the carrier and co-acting with the male member, the carrier and the members having complementary arcuate faces in contact, whereby a fluid-tight connection is maintained therebetween, the said members having partially spherical outer surfaces, a casing fitting on the female member, an exhaust ring carried by the female member and having a partially spherical bore complementary to the outer surface of the male member for receiving the latter and forming therewith a fluid-tight working contact.

20. In a rotary engine, a pair of intermeshing rotatable combustion members, one of said members having air cooled chambers segregated from its combustion chambers, means for forcing air into the chambers of the member, means for by-passing a portion of the air, and means for carrying off the air from the chambers of the members and the by-passed air in common.

21. An engine as set forth in claim 20 and a cooling sleeve surrounding the members, and means for discharging the air from the common carrying means onto the cooling sleeve.

22. An engine as set forth in claim 20 and an exhaust ring communicating with the combustion chambers of the members.

23. In a rotary engine, a rotatable carrier having fuel ports, means for introducing fuel into said carrier, a piston member surrounding and fast upon the carrier, a cylinder combustion member surrounding and rotatable upon the carrier, the cylinder member having recesses registering with the ports of the carrier and receiving the pistons of the other member, the carrier having flash ducts, and means for cooling the members.

24. An engine as set forth in claim 23 and a cooling sleeve surrounding the members.

25. An engine as set forth in claim 23 with the cylinder member provided with cooling chambers, connected with the cooling means, flues connected with the chambers, means for filtering the air discharged from the flues, a cooling sleeve surrounding the members, and means for discharging the air from the flues onto the sleeve.

In testimony whereof I affix my signature.

JESSE L. GRAY.